United States Patent [19]

Minami

[11] Patent Number: 5,372,900
[45] Date of Patent: Dec. 13, 1994

[54] METHOD OF REPRODUCING REFLECTING TYPE HOLOGRAM AND APPARATUS THEREFOR

[75] Inventor: Yoshitaka Minami, Omiya, Japan

[73] Assignee: Fuji Photo Optical Co., Ltd., Omiya, Japan

[21] Appl. No.: 38,976

[22] Filed: Mar. 29, 1993

[30] Foreign Application Priority Data

Mar. 27, 1992 [JP] Japan .................. 4-101747

[51] Int. Cl.⁵ .................. G01R 9/021; G03H 1/20
[52] U.S. Cl. .................. 430/1; 430/2; 430/321; 359/35; 359/12
[58] Field of Search .................. 430/1, 2, 323, 321; 359/12, 3, 15, 35

[56] References Cited

U.S. PATENT DOCUMENTS

| | | | |
|---|---|---|---|
| 3,767,310 | 10/1973 | Dickson | 359/15 |
| 3,838,903 | 10/1974 | Leith et al. | 359/12 |
| 3,875,026 | 4/1975 | Widmer | 430/2 |
| 3,944,420 | 3/1976 | Gale et al. | 430/323 |
| 4,148,549 | 4/1979 | Termanis | 359/35 |
| 4,895,419 | 1/1990 | Doyle et al. | 359/12 |
| 4,895,790 | 1/1990 | Swanson et al. | 430/323 |
| 4,942,102 | 7/1990 | Keys et al. | 430/2 |

FOREIGN PATENT DOCUMENTS

| | | | |
|---|---|---|---|
| 3514642 | 10/1986 | Germany | 359/15 |
| 60-164702 | 8/1985 | Japan | 430/1 |
| 62-297879 | 10/1987 | Japan | 430/1 |

OTHER PUBLICATIONS

Ng et al "Halographic Interferne lithography for integrated optics." IEEE trans. on Electronic Devices 25 pp. 1193–1200 (Oct./1978).

Caufield et al. "The Applications of Halography" 1971 pp. 44–46.

K. Tenjimbayashi, "Hologram Interferometer for Testing and Measuring Optical Surface Configuration- The Optical System Compensating Optical Inhomogeneity of Hologram Glass Substrate", Precision Engineering, vol. 56, No. 4, pp. 145–150 (1980).

*Primary Examiner*—Charles L. Bowers, Jr.
*Assistant Examiner*—Martin J. Angebranndt
*Attorney, Agent, or Firm*—Keck, Mahin & Gate

[57] ABSTRACT

A reflecting master hologram is illuminated with collimated coherent beams at an incident angle to provide regular reflected beams and diffracted beams. The regular reflected beams and the diffracted beams are directed to a reflective photoresist plate at the same angles as those at which they are, respectively, reflected by the reflecting master hologram so as to form an intensity pattern, i.e. a bright and dark pattern, of interference fringes on the reflective photoresist plate. The exposed photoresist plate is developed and etched to form a reflective hologram on the plate.

6 Claims, 2 Drawing Sheets

METHOD OF REPRODUCING REFLECTING TYPE HOLOGRAM AND APPARATUS THEREFOR

BACKGROUND OF THE INVENTION

1. Field of the Invention

This invention relates to a method of reproducing a reflecting type hologram used as an optical element.

2. Description of Related Art

Holograms are regarded as optical elements, such as lenses and prisms, which attributes to their producing of diffracted waves according to patterns of diffraction gratings. Holographic sinusoidal gratings and holographic lenses are well known for holographic optical elements (HOE). For example, in examining or measuring of spherical surfaces and aspherical surfaces by an interference method, a holographic optical element is used in place of a conventional interference standard to generate the same reconstructed wave front as a surface having an ideal surface of test object. Such a holographic optical element is produced by the use of a what is called a computer generated hologram (CGH). For a detailed description of a representative example of such a "holographic type" interferometer, reference may be had to "Precision Engineering" Vol. 56, No. 4, page 745, 1980, published by Precision Engineering Society.

Highly precise aspherical surfaces, such as cylindrical surfaces, as interference standards, are hardly formed by the grinding and polishing optical glass blocks. Rather, a computer generated hologram enables production of a holographic optical element with a high accuracy for reconstructing the wave front of an ideal aspherical surface.

However, since holographic optical elements need to be large in size and since computer generated holograms are made by computer aided electron beam pattern drawing or forming, such a holographic optical element produced with the use of a computer generated master hologram is too expensive to be utilized in examining and measuring instruments, such as interferometers, practically available to a manufacturing line of optical elements and/or optical instruments.

For the purpose of providing a brief background of conventional hologram reproduction that will enhance an understanding of the method of reproducing a hologram of the present invention, reference is made to FIG. 1. Before reproducing reflecting type holograms, prepared are a master hologram plate 51, which has a desired positive pattern of diffraction grating 55 formed on a transparent base plate 53, such as an optical glass plate, and a photoresist plate 61 which has a photoresist thin layer 65 formed or coated on one surface of a transparent substrate 63. After placing the master hologram plate 51 on top of the photoresist plate 61, the photoresist layer 65 of the photoresist plate 61 is exposed to collimated light $h_y$. Then, after the exposed photoresist plate 61 has been developed, it is immersed in an acid bath so as to remove an unexposed pattern, i.e. a negative pattern of diffraction grating 55, of the photoresist layer 65 and to chemically etch the negative pattern of the transparent substrate 63. Finally, the remaining portions of the photoresist layer 65, which are identical with the positive pattern of diffraction grating 55, are removed from the transparent substrate 63. As a result, a grating identical in pattern with the diffraction grating 55 of the master hologram plate 51 is reproduced on the transparent substrate 63.

This reflecting type hologram reproducing method is quite popular and efficient. However, reproduced holograms are poor in quality and precision for optical elements. This is because, the holograms include optical noise attributive to optical non-uniformity of the transparent plate 53.

SUMMARY OF THE INVENTION

It is therefore an object of the present invention to provide a method of reproducing a reflecting type of holograms with ease and high accuracy.

The foregoing object of the present invention is accomplished by providing a method of reproducing a reflecting type of hologram from a reflecting type master hologram. A reflecting master hologram, illuminated with collimated coherent beams at an incident angle, provides regular reflected beams and diffracted beams. The regular reflected beams and the diffracted beams are directed to a reflective photoresist plate, such as a photoresist layer formed on a reflective substrate, at the same angles as those at which they are, respectively, reflected by the reflecting master hologram so as to form an intensity pattern, i.e. a bright and dark pattern, of interference fringes on the reflective photoresist plate. After developing the photoresist layer so as to remove an exposed pattern, or bright pattern, of the photoresist layer from the reflective substrate, an unexposed pattern, i.e. a dark pattern, of the reflective substrate is etched, thereby forming the same grating pattern on the reflective substrate as that of the reflecting master hologram.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because holograms per se and photoetching techniques are well known, the present description will be directed in particular to processes and elements forming part of, or cooperating directly with, a hologram reproducing method in accordance with the present invention. It is to be understood that processes or treatments and elements not specifically shown or described can take various forms well known to those skilled in the art.

For a grating used as a master hologram to reproduce reflecting type holograms by the hologram reproducing method in accordance with the present invention, there are available various diffracting gratings, such as gratings made of chrome films, aluminum films, etc., which gratings have a specified reflection index. These originals may be of computer generated holograms. Otherwise, a reproduction of such a computer generated hologram may be used as a work copy of the master hologram.

The hologram reproducing method of this invention is favorable, in particular, to the reproduction of an optical holographic element functioning as an aspherical reflecting surface, such as a cylindrical reflecting surface, which reflects and provides a diffracted aspherical wave front.

Figure 1:
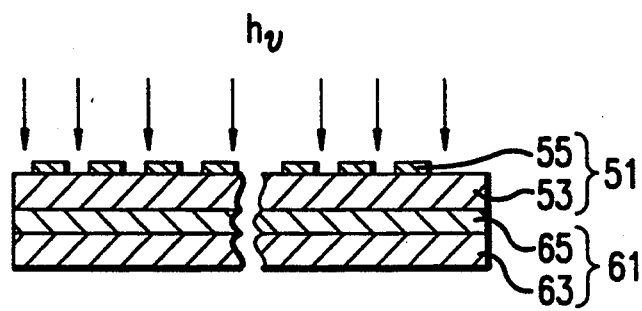
FIG. 1 is an illustration showing a conventional method of reproducing a reflecting type of hologram.
Figure 2:
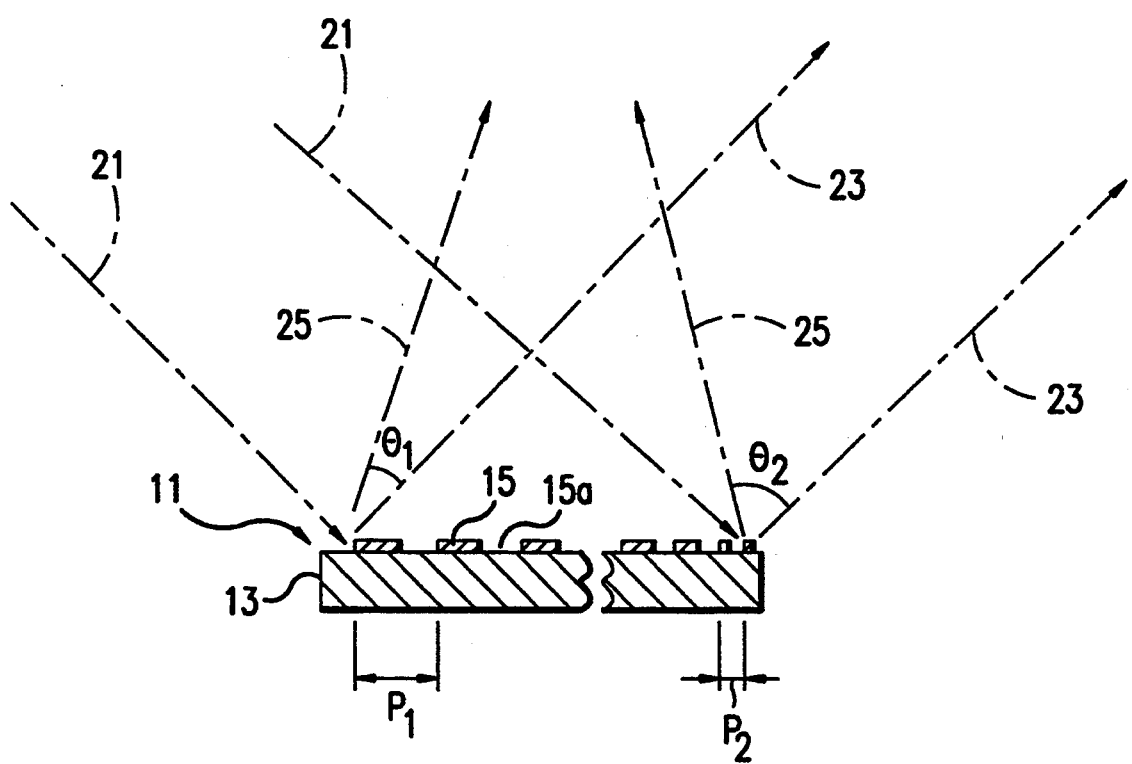
FIG. 2 is an illustration showing a reflecting hologram.

Referring to the drawings in detail, and in particular, to FIG. 2, a reflecting holographic optical element 11, which reflects and diffracts a flat wave front into an aspherical wave front, is shown, consisting of a diffraction grating 15 made of a chrome layer on top of a substrate, such as a transparent glass plate 13. This diffraction grating 15 is formed from a number of narrow slits 15a arranged in parallel at regularly changing separations or pitches, each slit 15a extending in a direction perpendicular to the plane of this drawing.

The reflecting holographic optical element 11 reflects collimated coherent beams 21 incident upon it at an angle partially as regular reflected beams 23 and partially as first order diffracted beams 25. In this instance, letting P, $\alpha$ and $\Theta$ be, respectively, a pitch of a slit of a diffraction grating, an incident angle of collimated beams and a diffraction angle of the diffraction grating, there is a general optical relation as follows:

$$P(\sin \alpha - \sin \Theta) = \lambda$$

where $\lambda$ is the wavelength of incident light.

Consequently, forming the slits 15a of the diffraction grating 15 arranged to linearly change from a pitch $P_1$ at one side to a pitch $P_2$ at another side diffracts the coherent beams 21 as diffracted beams 25 at correspondingly linearly changed diffraction angles from $\Theta_1$ to $\Theta_2$. By appropriately changing the pitches of slits 15a of the diffraction grating 15, the diffracted beams 25 reflected by the reflecting holographic optical element 11 are just as if they were reflected by a cylindrical reflecting surface.

Figure 3:
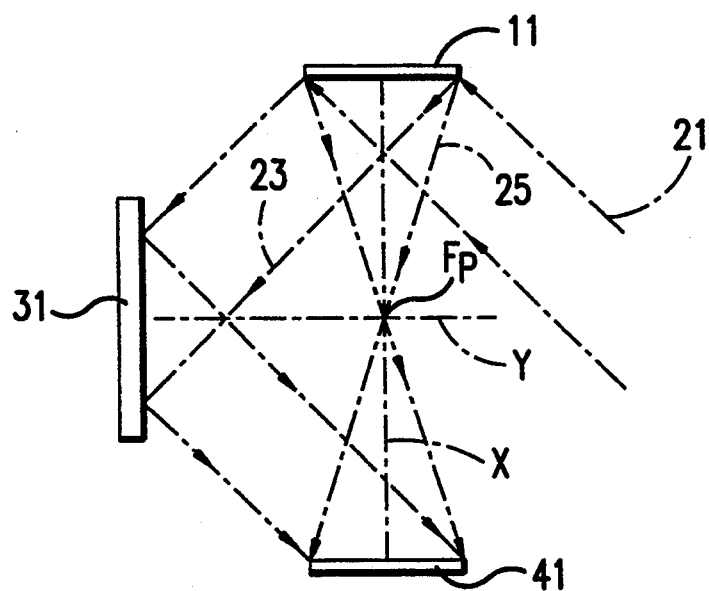
FIG. 3 is an illustration showing the method of reproducing a reflecting hologram in accordance with a preferred embodiment of the present invention.
Figure 4A:
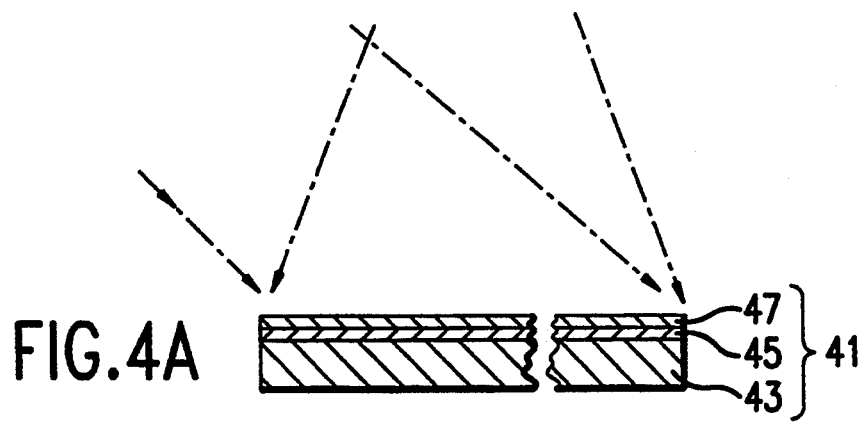
FIG. 4 is an illustration showing the processes of making a reflecting hologram.
Figure 4B:
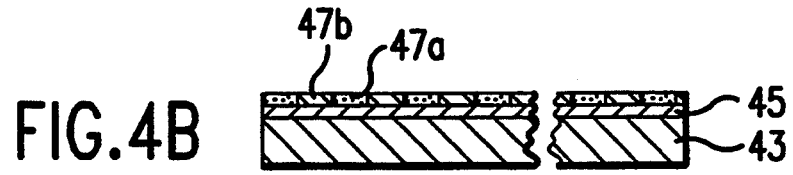
Figure 4C:
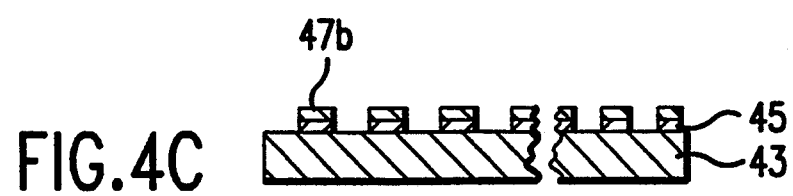
Figure 4D:
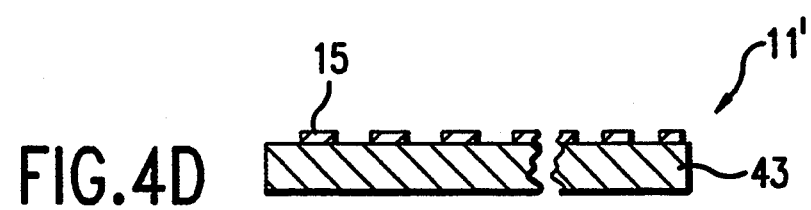

Referring to FIG. 3 illustrating the hologram reproducing method in accordance with a preferred embodiment of the present invention in which the reflecting holographic optical element 11, shown in FIG. 2, is used as a master hologram plate, there are a flat reflection mirror 31 and a photoresist plate 41 which is comprised by a reflective chrome film or layer formed over a base plate or substrate, such as a glass plate, and a photoresist layer formed over the reflective layer which will be described in detail later. All of these elements 11, 31 and 41 have their normal lines or optical axes lying on the same plane as the drawing. Specifically, the reflecting holographic optical element 11 and the photoresist plate 41 are placed face to face and coaxial with an optical axis X. The flat reflection mirror 31 is arranged with its optical axis Y perpendicular to the optical axis X, with respect to which the reflecting holographic optical element 11 and the photoresist plate 41 are arranged symmetrically.

When collimated coherent beams 21, such as laser beams, are directed to the reflecting holographic optical element 11, the reflected beams are divided into two parts, i.e. regular reflected beams 23 having a flat wave form and diffracted beams 25 having a cylindrical wave form. The flat wave form beams 23 are directed to and, then, reflected by the flat reflection mirror 31 so as to be directed to the photoresist plate 41. On the other hand, the cylindrical wave form beams 25 are focused at a point $F_p$ and, then, diverged toward the photoresist plate 41. As a result, there occurs an interference between the flat wave form beams 23 and the cylindrical wave form beams 25 to form a bright and dark pattern of interference fringes. The bright or highlight pattern of interference fringes, to which the photoresist plate 41 is effectively exposed, corresponds to the pattern of the diffraction grating 15.

FIGS. 4(A)-4(D) illustrate the process of chemical etching of the exposed photoresist plate 41; the photoresist plate 41 has a glass plate 43 as the substrate, a thin chrome layer or film 45 formed or coated as a reflective-interim layer over the glass plate 43, and a photoresist plastic layer 47 formed or coated over the chrome layer 45. The photoresist layer 47 of the photoresist plate 41 is exposed at step (A), as shown in FIG. 4, to the bright or highlight pattern of interference fringes so as to form an alternative pattern of exposed strips 47a and unexposed strips 47b at step (B), as shown in FIG. 4. Only the exposed strips 47a are changed to be chemically soluble. When dipping the photoresist plate 41 in an etching solution, the exposed strips 47a of the photoresist layer 47 and portions of the chrome layer 45 exactly corresponding to the exposed strips 47a are dissolved by the etching solution and removed at step (C), as shown in FIG. 4. Finally, removing the unexposed strips 47b leaves strips of chrome layer 45, which are in exactly the same pattern as the original diffraction grating 15, on the glass plate 43 at step (D), as shown in FIG. 4. Through these processes or steps (A)-(D), the exactly same diffraction grating as the original diffraction grating 15 is reproduced on the chrome layer 45 as a reflecting hologram 11'.

Although the surface flatness of flat reflecting mirror 31 is considered as a serious cause of a decrease in accuracy of reproduced holograms, nevertheless, it is easy to provide optically flat mirror surfaces with a high accuracy by means of modern mirror producing techniques. Therefore, according to the present invention, reflecting holograms, even ones which have large hologram areas, are easily reproduced with a high accuracy and even at a low producing cost, and, consequently, are widely available to applications, such as standard surfaces of general purpose interferometers.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. A method of reproducing a hologram comprising the steps of:

providing a reflecting master hologram having a normal line extending perpendicularly thereto;

placing a flat reflection mirror parallel to said normal line;

positioning a photoresist layer, formed on a reflective substrate, perpendicular to said normal line and symmetric to said reflecting master hologram with respect to said flat reflection mirror;

directing a collimated coherent beam to said reflecting master hologram at an incident angle relative to said normal line so as to direct a regular reflection beam reflected by said reflecting master hologram to said flat reflection mirror and a diffraction beam diffracted and reflected by said reflecting master hologram to said photoresist layer formed on the reflective substrate, thereby causing said regular reflection beam, regularly reflected by said flat reflection mirror, and said diffraction beam to form an intensity pattern of interference fringes on said photoresist layer;

developing said photoresist layer so as to remove exposed portions of said photoresist layer;

etching said reflective substrate with said photoresist layer developed; and removing unexposed portions of said photoresist layer from said reflective substrate.

2. A method as defined in claim 1, wherein said reflective substrate comprises a reflective layer formed on a glass plate.

3. A method as defined in claim 2, wherein said reflective layer is made of chrome.

4. An apparatus for reproducing a hologram from a master hologram comprising:

a reflecting master hologram;

a flat reflection mirror placed parallel to a normal line of said reflecting master hologram;

a reflective photoresist plate placed perpendicular to said normal line and symmetric to said reflecting master hologram with respect to said flat reflection mirror, said reflective photoresist plate comprising a reflective layer formed over a substrate and a photoresist layer formed over said reflective layer; and light source means for generating and directing a collimated coherent beam toward said reflecting master hologram at an incident angle relative to said normal line, thereby directing, on one hand, a regular reflected beam reflected by said reflecting master hologram to said flat reflection mirror and directing said regular reflected beam regularly reflected by said flat reflection mirror to said reflective photoresist plate, and, on the other hand, directing a diffraction beam diffracted by said reflecting master hologram to said reflective photoresist plate so as to cause said regular reflection beam and said diffraction beam to form an intensity pattern of interference fringes on said reflective photoresist plate.

5. An apparatus as defined in claim 4, wherein said reflective layer is made of chrome.

6. An apparatus as defined in claim 4, wherein said substrate is a glass plate.

* * * * *